Sept. 7, 1948.   F. W. TAYLOR   2,448,691
CINEMATOGRAPHIC METHOD AND APPARATUS
Filed June 15, 1945
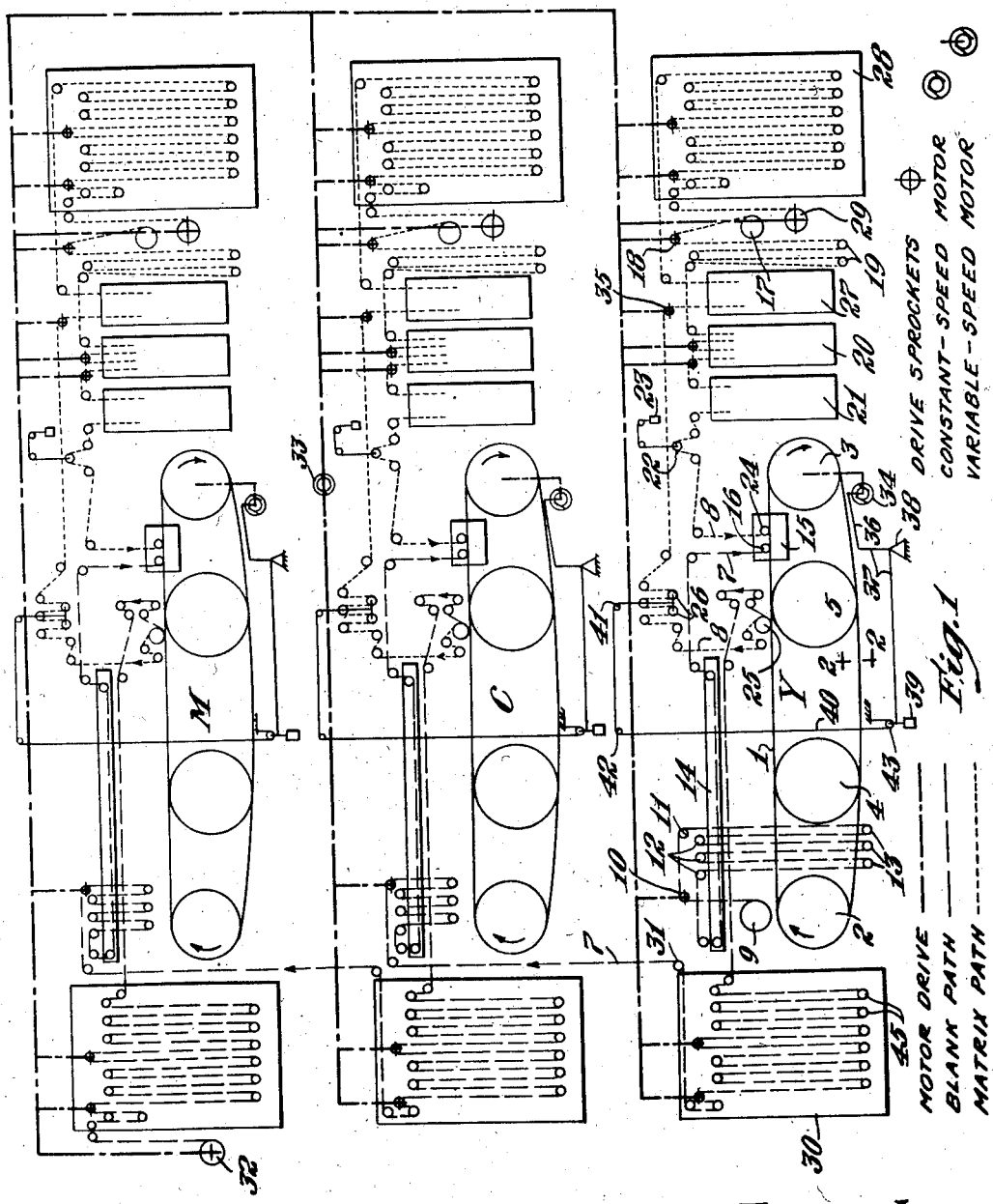
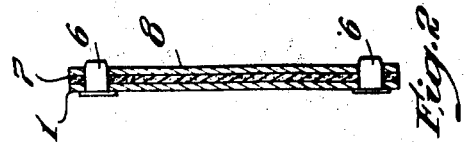
Inventor
Frank W. Taylor
By Roberts, Cushman & Grover
att'ys.

Patented Sept. 7, 1948

2,448,691

UNITED STATES PATENT OFFICE 2,448,691

CINEMATOGRAPHIC METHOD AND APPARATUS

Frank W. Taylor, Los Angeles, Calif., assignor to Technicolor Motion Picture Corporation, Hollywood, Calif., a corporation of Maine Application June 15, 1945, Serial No. 599,593

10 Claims. (Cl. 271—2.3)

In the art of cinematography it is often desirable successively to register a plurality of auxiliary films with a main film on a plurality of carriers respectively, each carrier having a succession of register teeth engaging the sprocket holes of the films, the main film feeding successively from one carrier to the other and one auxiliary film feeding into superposition with the main film on each carrier, and the films feeding to and from the carriers through processing chambers and over sprocket wheels. Sometimes the carriers are in the form of large drums or wheels having marginal rows of teeth extending around their peripheries and sometimes they are in the form of endless belts traveling continuously around two or more drums or sheaves.

This application is a continuation-in-part of the parent application Ser. No. 523,809, filed Feb. 25, 1944.

One example of such practice involves printing color pictures on a blank from a plurality of matrix films, the blank constituting the main film and the matrices constituting the auxiliary films. For this purpose it has been proposed to feed the blank film continuously from one carrier to another throughout the series of two or more carriers, the blank traveling with each carrier throughout a portion of its orbit to permit dye transfer from the matrix film to the blank film, different matrices being fed into contact with the blank film on the different carriers respectively. Another example is found in the film-stripping art where the layers of a multi-layer film are successively stripped off and transferred to separate bases respectively, the multi-layer film constituting the main film and the separate bases constituting the auxiliary films.

In each case it is necessary to feed the films to and from the carriers through processing chambers and over sprocket wheels. In imbibition printing the blank film should be soaked in water for a short time before being fed to each carrier and dried after leaving each carrier, and each matrix must be soaked in dye before passing to its carrier and then dried before being reeled up. Likewise in film stripping it is usually necessary to wet both films before passing to each carrier and to dry them after leaving each carrier.

Objects of the present invention are to provide a method and apparatus which keeps the carriers and sprocket wheels in synchronism without damaging the films, which minimizes the danger of damage to the main film, which requires a minimum number of motors, which compensates for slippage of the aforesaid endless belts on their sheaves, which permits accurate timing in the processing chambers, which effects accurate registration of the pictures in relation to the sprocket holes, which avoids the danger of damage to the films due to momentary lack of synchronism between successive parts of the feeding means, and generally to improve the art to which the invention relates.

In one aspect the present invention involves the method of propelling the films by driving the sprocket wheels at constant and equal speed, driving each of the carriers at variable speed, and regulating the speed of each carrier in accordance with variations in the length of one of the films, preferably one of the auxiliary films, between the carrier and an adjacent one of the sprocket wheels. By driving the sprocket wheels at constant speed the timing in the processing chambers may be maintained constant, and by using the auxiliary film to regulate the speed of the carrier there is less danger of damaging the main film, which is usually the most valuable and can be replaced less easily.

In another aspect the invention involves apparatus which comprises means for driving the sprocket wheels at constant and equal speed, in combination with means for driving each of the carriers at variable speed, and means for regulating the speed of each carrier in accordance with variations in the length of one of the films between the carrier and an adjacent one of the sprocket wheels. In the preferred embodiment all of the driven sprocket wheels of the plurality of groups, which are associated with the plurality of carriers respectively, are kinematically interconnected so that they must rotate in unison, and a single constant-speed motor may then be used to actuate all of the driven sprocket wheels.

For the purpose of illustration a typical embodiment of the invention is shown in the accompanying drawing in which Fig. 1 is a diagram of imbibition apparatus for printing a blank film from three matrix films successively, and Fig. 2 is a section on line 2—2 of Fig. 1.

The particular embodiment chosen for the purpose of illustration comprises three parts Y, C and M for printing the yellow, cyan and magenta aspects of color motion pictures. Each of the three parts comprises a pin belt 1 trained over sheaves 2, 3, 4 and 5, the belt having marginal rows of teeth or pins 6 adapted to fit into the sprocket holes of the blank and matrix film 7 and 8 while the two films travel in superposition on the belt. The belt is trained over the sheaves in two loops, looping around the pair 3—4, thence crossing from 4 to 5, thence looping around pair 2—5, and thence returning from 2 to 3. The blank 7 feeds from a supply reel 9 over rolls 10 and 11, thence through an elevator comprising upper rolls 12 rotating about fixed axes and lower rolls 13 which are supported by the film loops and which move up and down to accommodate variation in the degree of film shrinkage and differences in the rate of drive of the belt 1 and the driven sprocket wheel 10. From the elevator the blank passes through a pre-wet tank 14 and thence to a roll tank 15 where the blank is seated on the belt by means of a roller 16. The matrix 8 feeds from a supply reel 17 over a driven sprocket 18, thence through an elevator comprising lower floating rollers 19, thence through a dye tank 20, thence through a wash tank 21 where the superficial dye is washed off, thence over a series of rollers comprising a roller 22 held up by weight 23 to provide a safety loop in the film, and thence under roll 24 where the matrix is seated on the belt in face-to-face contact with the blank 7. From the roll tank 15 the two films travel together until they reach the roll 25, during which time the yellow components of the pictures are printed on the blank by imbibition of dye by the blank from the matrix. After leaving the pin belt at roller 25 the matrix 8 travels over a series of rolls including floating elevator rolls 26, thence to matrix rinse tank 27, thence to dry box 28, and thence to the take-up reel 29.

After leaving the pin belt 1 at roller 25 the blank 7 passes to the dry box 30 and thence over roll 31 to the cyan portion C of the apparatus where it is printed with the cyan matrix, and thence to the magenta portion M of the apparatus. The cyan portion C is identical with the yellow portion Y except in that it has no feed reel for the blank film corresponding to 9 of the Y portion; and the magenta M is identical with the yellow portion Y except in that it has a take-up reel 32 for the blank instead of the feed reel 9.

All of the driven sprocket rolls, which are indicated by crosses, are kinematically interconnected with each other and with a constant speed motor 33 as indicated by the dot and dash lines. By distributing the driven sprockets between the various chambers through which the films pass, in the manner indicated in Fig. 1, and by driving all of these sprockets in unison with a single constant-speed motor, the length of treatment in the various chambers may be maintained constant.

Each of the pin belts is driven by a variable speed motor 34 whose speed is regulated by the elevator 26 through which the matrix film passes as it leaves the pin belt and before it reaches the first driven sprocket which is indicated at 35. The control arm of the motor 34 is connected with the elevator 26 through a link 36, a bellcrank 37 pivoted to a stationary support 38, a weight 39 and a cable 40 extending from the elevator 26 over pulleys 41, 42 and 43 to a stationary anchorage. If the pin belt is driven faster than the driven sprocket wheels 10, 18, 35, etc., the elevator 26 descends, thereby decelerating the motor 34. When the pin belt begins to lag behind the elevator 26 rises and the speed of the motor 34 is increased.

In using this apparatus for stripping layers of emulsion from a multi-layer film and transferring them to new bases, the multi-layer film would follow the path of film 7 and the separate bases would follow the paths of the matrix films 8 respectively. Moreover the tanks 20 would not be used. The apparatus would then operate according to the disclosures of copending applications Serial No. 440,323, which is now Patent No. 2,415,442; Serial No. 522,711, which is now Patent No. 2,437,361; and Serial No. 523,809, which is now abandoned.

A characteristic feature of the invention consists in that the driven sprocket wheels are operated in unison at constant speed and the speed of each pin belt is varied to keep it in synchronism with the constant speed sprockets. In this way the variations in speed do not affect the timing of the various treatments applied to the films as they pass to and from the pin belts. Moreover the slippage of the pin belts on their sheaves, some of which is inevitable, is compensated for.

Another characteristic feature of the invention consists in that the films are peeled apart as they leave the pin belts at the rollers 25 by means of yielding portions applied by elevators floating in depending loops of the films. The elevator 26 yieldingly pulls the matrix film away from the roller 25 and the floating rolls 45 of the elevators in the dry boxes 30 yieldingly pull the blank film away from the matrix film at the roll 25. Thus the danger of damage to the films is minimized.

It should be understood that the present disclosure is for the purpose of illustration only and that this invention includes all modifications and equivalents which fall within the scope of the appended claims.

I claim:

1. In the art of cinematography which comprises successively registering auxiliary films with a main film on a plurality of carriers which hold the films in registered contact throughout paths of considerable length, the main film feeding successively from one carrier to the other and one auxiliary film feeding into superposition with the main film on each carrier, the films feeding to and from the carriers through processing chambers and over driven sprocket wheels which engage the films throughout relatively short lengths, the method of propelling the films which comprises driving said sprocket wheels at constant and equal speed, driving each of said carriers at variable speed, and regulating the speed of each carrier in accordance with variations in the length of one of said films between that carrier and an adjacent one of said sprocket wheels, whereby the films are maintained in synchronism while keeping the speed constant in said processing chambers, even though said carriers and sprocket wheels have different degrees of inertia.

2. In the art of cinematography which comprises successively registering auxiliary films with a main film on a plurality of carriers which hold the films in registered contact throughout paths of considerable length, the main film feeding successively from one carrier to the other and one auxiliary film feeding into superposition with the main film on each carrier, the films feeding to and from the carriers through processing chambers and over driven sprocket wheels which engage the films throughout relatively short lengths, the method of propelling the films which comprises driving said sprocket wheels at constant and equal speed, driving each of said carriers at variable speed, and regulating the speed of each carrier in accordance with variations in the length of one of said auxiliary films between that carrier and an adjacent one of said sprocket wheels, whereby the films are maintained in synchronism while keeping the speed constant in said processing chambers even though said carriers and sprocket wheels have different degrees of inertia.

3. In the art of cinematography which comprises successively registering auxiliary films with a main film on a plurality of endless belts respectively, each belt having a succession of register teeth engaging the sprocket holes of the films, the main film feeding successively from one belt to the other and one auxiliary film feeding into superposition with the main film on each belt, the films feeding to and from the belts through processing chambers and over driven sprocket wheels, the method of propelling the films which comprises driving said sprocket wheels at constant and equal speed, driving each of said belts at variable speed, and regulating the speed of each belt in accordance with variations in the length of one of said films between that belt and an adjacent one of said sprocket wheels, whereby the films are maintained in synchronism while keeping the speed constant in said processing chambers.

4. In the art of cinematography which comprises successively registering auxiliary films with a main film on a plurality of endless belts respectively, each belt having a succession of register teeth engaging the sprocket holes of the films, the main film feeding successively from one belt to the other and one auxiliary film feeding into superposition with the main film on each belt, the films feeding to and from the belts through processing chambers and over driven sprocket wheels, the method of propelling the films which comprises driving said sprocket wheels at constant and equal speed, driving each of said belts at variable speed, and regulating the speed of each belt in accordance with variations in the length of one of said auxiliary films between that belt and an adjacent one of said sprocket wheels, whereby the films are maintained in synchronism while keeping the speed constant in said processing chambers.

5. In the art of cinematography which comprises successively registering auxiliary films with a main film on a plurality of carriers which hold the films in registered contact throughout paths of considerable length, the main film feeding successively from one carrier to the other and one auxiliary film feeding into superposition with the main film on each carrier, the films feeding to and from the carriers through processing chambers and over driven sprocket wheels which engage the films throughout relatively short lengths, apparatus comprising means for driving said sprocket wheels at constant and equal speed, means for driving each of said carriers at variable speed, and means for regulating the speed of each carrier in accordance with variations in the length of one of said films between that carrier and an adjacent one of said sprocket wheels, whereby the films are maintained in synchronism while keeping the speed constant in said processing chambers even though said carriers and sprocket wheels have different degrees of inertia.

6. In the art of cinematography which comprises successively registering auxiliary films with a main film on a plurality of carriers which hold the films in registered contact throughout paths of considerable length, the main film feeding successively from one carrier to the other and one auxiliary film feeding into superposition with the main film on each carrier, the films feeding to and from the carriers through processing chambers and over driven sprocket wheels which engage the films throughout relatively short lengths, apparatus comprising means for driving said sprocket wheels at constant and equal speed, means for driving each of said carriers at variable speed, and means for regulating the speed of each carrier in accordance with variations in the length of one of said auxiliary films between that carrier and an adjacent one of said sprocket wheels, whereby the films are maintained in synchronism while keeping the speed constant in said processing chambers even though said carriers and sprocket wheels have different degrees of inertia.

7. In the art of cinematography which comprises successively registering auxiliary films with a main film on a plurality of endless belts respectively, each belt having a succession of register teeth engaging the sprocket holes of the films, the main film feeding successively from one belt to the other and one auxiliary film feeding into superposition with the main film on each belt, the films feeding to and from the belts through processing chambers and over driven sprocket wheels, apparatus comprising means for driving said sprocket wheels at constant and equal speed, means for driving each of said belts at variable speed, and means for regulating the speed of each belt in accordance with variations in the length of one of said films between that belt and an adjacent one of said sprocket wheels, whereby the films are maintained in synchronism while keeping the speed constant in said processing chambers.

8. In the art of cinematography which comprises successively registering auxiliary films with a main film on a plurality of endless belts respectively, each belt having a succession of register teeth engaging the sprocket holes of the films, the main film feeding successively from one belt to the other and one auxiliary film feeding into superposition with the main film on each belt, the films feeding to and from the belts through processing chambers and over driven sprocket wheels, apparatus comprising means for driving said sprocket wheels at constant and equal speed, means for driving each of said belts at variable speed, and means for regulating the speed of each belt in accordance with variations in the length of one of said auxiliary films between that belt and an adjacent one of said sprocket wheels, whereby the films are maintained in synchronism while keeping the speed constant in said processing chambers.

9. In the art of cinematography which comprises successively registering auxiliary films with a main film on a plurality of endless belts respectively, each belt having a succession of register teeth engaging the sprocket holes of the films, the main film feeding successively from one belt to the other and one auxiliary film feeding into superposition with the main film on each belt, the films feeding to and from the belts through processing chambers and over driven sprocket wheels, apparatus comprising means kinematically interconnecting said sprocket wheels so that they must rotate in unison, a motor for driving said means, means for driving each of said belts at variable speed, and means for regulating the speed of each belt in accordance with variations in the length of one of said films between that belt and an adjacent one of said sprocket wheels, whereby the films are maintained in synchronism while keeping the speed constant in said processing chambers.

10. In the art of cinematography which comprises successively registering auxiliary films with a main film on a plurality of endless belts respectively, each belt having a succession of register teeth engaging the sprocket holes of the films, the main film feeding successively from one belt to the other and one auxiliary film feeding into superposition with the main film on each belt, the films feeding to and from the belts through processing chambers and over driven sprocket wheels, apparatus comprising means kinematically interconnecting said sprocket wheels so that they must rotate in unison, a motor for driving said means, means for driving each of said belts at variable speed, and means for regulating the speed of each belt in accordance with variations in the length of one of said auxiliary films between that belt and an adjacent one of said sprocket wheels, whereby the films are maintained in synchronism while keeping the speed constant in said processing chambers.

FRANK W. TAYLOR.

REFERENCES CITED

The following references are of record in the file of this patent:

UNITED STATES PATENTS

| Number | Name | Date |
|---|---|---|
| 1,704,238 | Kienninger | Mar. 5, 1929 |
| 2,199,175 | Hardenberg | Apr. 30, 1940 |
| 2,237,917 | Shackleton | Apr. 8, 1941 |
| 2,328,492 | Rackett | Aug. 31, 1943 |